US009975551B2

(12) United States Patent
Kido

(10) Patent No.: US 9,975,551 B2
(45) Date of Patent: May 22, 2018

(54) VEHICLE EXTERIOR ENVIRONMENT RECOGNITION DEVICE

(71) Applicant: SUBARU CORPORATION, Tokyo (JP)

(72) Inventor: Shinnosuke Kido, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days. days.

(21) Appl. No.: 14/447,346

(22) Filed: Jul. 30, 2014

(65) Prior Publication Data

US 2015/0039202 A1 Feb. 5, 2015

(30) Foreign Application Priority Data

Aug. 5, 2013 (JP) ................................. 2013-162089

(51) Int. Cl.
*G05D 1/00* (2006.01)
*G06F 7/00* (2006.01)
*B60W 30/16* (2012.01)
*G06K 9/00* (2006.01)

(52) U.S. Cl.
CPC ......... *B60W 30/16* (2013.01); *G06K 9/00825* (2013.01); *B60W 2550/22* (2013.01); *B60W 2750/30* (2013.01)

(58) Field of Classification Search
CPC ......... B60W 2550/22; B60W 2750/30; B60W 30/16; G08G 1/052; G08G 1/09623; G08G 1/16; G08G 1/166; G08G 1/167
USPC .................. 701/23, 25, 41, 93, 96, 117, 514
See application file for complete search history.

(56) References Cited

U.S. PATENT DOCUMENTS

| 6,100,819 A * | 8/2000 | White ...................... G08G 1/07 340/902 |
|---|---|---|
| 6,366,219 B1 * | 4/2002 | Hoummady ............. G08G 1/04 340/907 |
| 2006/0080029 A1 * | 4/2006 | Kodani ................... G01C 21/32 701/420 |
| 2007/0061066 A1 * | 3/2007 | Bruelle-Drews ...... G01C 21/26 701/532 |
| 2009/0135271 A1 * | 5/2009 | Kurane ................. H04N 5/2354 348/222.1 |
| 2009/0174573 A1 * | 7/2009 | Smith ................... G08G 1/0962 340/905 |
| 2009/0326751 A1 * | 12/2009 | Otake ....................... B60T 7/22 701/25 |

(Continued)

FOREIGN PATENT DOCUMENTS

| JP | 3349060 B2 | 11/2002 |
| JP | 2007-186175 A | 7/2007 |

(Continued)

*Primary Examiner* — Khoi H Tran
*Assistant Examiner* — Jorge O Peche
(74) *Attorney, Agent, or Firm* — McDermott Will & Emery LLP

(57) ABSTRACT

A vehicle exterior environment recognition device includes a traffic light identifying module that identifies one or more traffic lights located ahead of a vehicle, and traffic light colors of the traffic lights, and a control input identifying module that identifies, when multiple traffic lights exist, traffic lights to be used as control inputs based on whether the multiple traffic lights are located on both the left and right sides of a traveling path of the vehicle, and whether the multiple traffic lights are same in color.

12 Claims, 19 Drawing Sheets

(56) References Cited

U.S. PATENT DOCUMENTS

| | | | |
|---|---|---|---|
| 2010/0253598 A1* | 10/2010 | Szczerba | G01S 13/723 345/7 |
| 2011/0098916 A1* | 4/2011 | Jang | G01C 21/3697 701/533 |
| 2012/0221207 A1* | 8/2012 | Nakamura | G01C 21/3407 701/41 |
| 2012/0262579 A1* | 10/2012 | Chen | G08G 1/0175 348/148 |
| 2012/0288145 A1* | 11/2012 | Kido | G06K 9/00791 382/103 |
| 2012/0288146 A1* | 11/2012 | Kido | G06K 9/00805 382/103 |
| 2012/0288149 A1* | 11/2012 | Kido | G06K 9/00825 382/103 |
| 2012/0288150 A1* | 11/2012 | Kido | G06K 9/2018 382/103 |
| 2012/0288151 A1* | 11/2012 | Kido | G08G 1/165 382/103 |
| 2012/0288191 A1* | 11/2012 | Kido | G06K 9/4652 382/165 |
| 2013/0038754 A1* | 2/2013 | Watarai | H04N 5/77 348/231.3 |
| 2013/0076538 A1* | 3/2013 | Uno | G08G 1/096716 340/905 |
| 2013/0079964 A1* | 3/2013 | Sukkarie | G01C 21/3469 701/22 |
| 2013/0250109 A1* | 9/2013 | Yokota | H04N 5/2254 348/148 |

FOREIGN PATENT DOCUMENTS

| | | | |
|---|---|---|---|
| JP | 2008-130059 A | | 6/2008 |
| JP | 2010-100120 A | | 5/2010 |
| JP | 2010-224925 A | | 10/2010 |
| JP | 2010224925 A | * | 10/2010 |
| JP | 2010224925 A | * | 10/2010 |
| JP | 2012-185562 A | | 9/2012 |

* cited by examiner

VEHICLE EXTERIOR ENVIRONMENT RECOGNITION DEVICE

CROSS-REFERENCE TO RELATED APPLICATION

The present application claims priority from Japanese Patent Application No. 2013-162089 filed on Aug. 5, 2013, the entire contents of which are hereby incorporated by reference.

BACKGROUND

1. Technical Field

The present disclosure relates to vehicle exterior environment recognition devices that recognize environment outside a vehicle. More specifically, the present disclosure relates to a vehicle exterior environment recognition device that identifies a traffic light to be used as a control input of the vehicle.

2. Related Art

There are conventionally known a technique, such as collision avoidance control, which detects specific objects including another vehicle and a traffic light located ahead of a vehicle and avoid a collision with the leading, and a technique, such as a cruise control, which recognizes the color of the traffic light and controls to maintain a distance between own vehicle and a leading vehicle at a safe distance (for instance, see Japanese Patent No. 3,349,060).

Such a specific object is extracted from an image obtained by imaging an environment outside and ahead of the vehicle, based on the luminance and a distance data. For instance, Japanese Unexamined Patent Application Publication (JP-A) No. 2010-224925 discloses a technique to capture a color image outside the vehicle, group adjacent pixels, and recognize a light source, such as the traffic light, based on the distance, size, height, and a position of a grouped pixel with respect to a course of the vehicle.

The technique disclosed in JP-A No. 2010-224925 described above grasps the course of the vehicle from a lane line on a road surface based on a horizontal geometric model of the road surface in a real space, and determines a traffic light which exists on the course of the vehicle to be a traffic light for the vehicle. However, in an actual vehicle external environment, since the traffic light is recognized by various location patterns depending on the position of the traffic light, and the position and direction of the vehicle, the traffic light for the vehicle does not always exist on the course of the vehicle. Thus, in the technique disclosed in JP-A No. 2010-224925, an accuracy of identifying the traffic light for the vehicle cannot be improved.

SUMMARY OF THE INVENTION

The present disclosure has been designed in consideration of the circumstances described above, and an object thereof is to provide a vehicle exterior environment recognition device that improves an accuracy of identifying a traffic light to be used as a control input of the vehicle, regardless of an environment outside a vehicle.

An aspect of the present disclosure provides a vehicle external environment recognition device that includes a traffic light identifying module that identifies one or more traffic lights located ahead of a vehicle and a traffic light color of the one or more traffic lights, and a control input identifying module that identifies, when multiple traffic lights exist, traffic lights to be used as control inputs based on whether the multiple traffic lights are located on both the left and right sides of a traveling path of the vehicle, and whether the multiple traffic lights are same in color.

When the multiple traffic lights are located on both the left and right sides of the traveling path of the vehicle, and when all the multiple traffic lights are same in color, the control input identifying module may use all the multiple traffic lights as the control inputs.

When the multiple traffic lights are located on both the left and right sides of the traveling path of the vehicle, and when the multiple traffic lights are not same in color, the control input identifying module may use a traffic light of which a traveling path lateral position that is a relative position in a direction perpendicular to the traveling, path is nearest to the traveling path, and one or more other traffic lights which have a same color as the traffic light, as the control inputs.

The traveling path lateral position may be defined as a relative position of a traffic light in a direction perpendicular to the traveling path. When the multiple traffic lights are not located on both the left and right sides of the traveling path of the vehicle, and when a traveling path lateral position of a traffic light, nearest to the traveling path falls within a first predetermined range, and a traveling path lateral position of a traffic light, furthest from the traveling path falls within a second predetermined range, the control input identifying module may use the traffic light of which the traveling path lateral position is nearest to the traveling path, and one or more other traffic lights which have a same color as the traffic light, as the control inputs.

When only one traffic light exists, when a traveling path lateral position of the traffic light falls within a third predetermined range, and when a forward straight line lateral position of the traffic light, that is a relative position of the traffic light in the width direction with respect to a forward straight line of the vehicle, falls within a fourth predetermined range, the control input identifying module may use the traffic light as the control input.

The vehicle external environment recognition device may further include a traveling path predicting module that predicts the traveling path based on a current traveling condition of the vehicle, and a traveling path restricting module that restricts the predicted traveling path in the width direction of the vehicle, according to at least one or more parameters selected from the group consisting of a traveling speed of the vehicle, an indicating state of a blinker, an angular speed of the vehicle, and a steering angle. The control input identifying module may identify a traffic light that exists ahead of the vehicle based on the restricted traveling path and that is to be used as the control input.

The traveling path restricting module may restrict the traveling path on both the left and ht sides in the width direction, when the traveling speed of the vehicle is a predetermined value or less.

The traveling path restricting module may restrict the traveling path to either one of left and right side on which one blinker is not operated, when the other blinker is in operation.

The traveling path restricting module may wait for progress of a predetermined extension time after the operation of the blinker is finished, and may then cancel the restriction of the traveling path.

When the traveling speed of the vehicle is a predetermined value or greater, and when an angular speed of the vehicle or a absolute value of a steering angle is a predetermined value or greater, the traveling path restricting module may restrict the traveling path on both the left and right side in the width direction.

The traveling path restricting module may wait for progress of a predetermined extension time after the traveling speed of the vehicle becomes the predetermined value or less or the angular speed of the vehicle or the absolute value of the steering angle becomes the predetermined value or less, and may then cancel the restriction of the traveling path.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Figure 1:
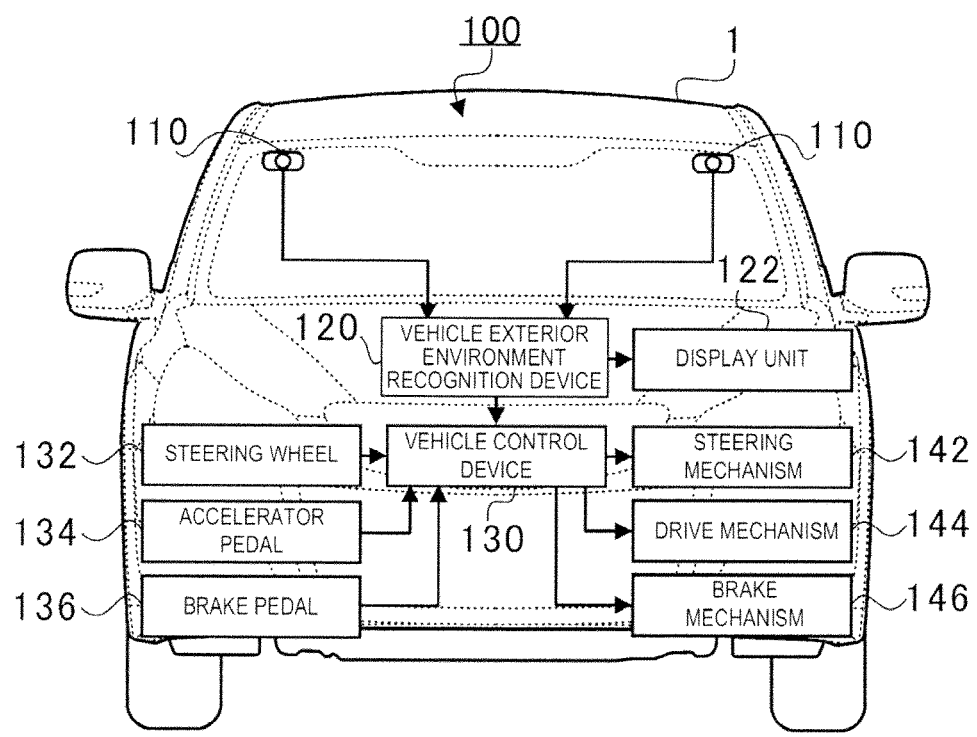
FIG. 1 is a block diagram illustrating a connecting relation of an environment recognition system.

Hereinafter, a suitable example of the present disclosure will be described in detail with reference to the accompanying drawings. Dimensions, materials, and others such as specific numerical values illustrated in this example are merely instances for easier understanding of the invention, and do not limit the present disclosure unless otherwise particularly specified. Note that, in this description and the drawings, elements having substantially the same function and the configuration are assigned with the same reference numerals to omit redundant explanation. Further, illustration of elements which are not directly related to the present disclosure is omitted.

In recent years, vehicles which equips so-called a collision avoidance function (adaptive cruise control: ACC) have been widely spreading. This function is to image road environment ahead of the vehicle by on-board cameras mounted to the vehicle, specifies objects such as leading vehicles based on color information and/or positional information within the image to avoid a collision with the specified object and/or maintain an inter-vehicle distance with the leading vehicle at a safe distance.

In such vehicles equipped with a vehicle exterior environment recognition device that recognizes the environment outside the vehicle, a traveling state of the vehicle which equips the vehicle exterior environment recognition device (hereinafter, may simply be referred to as "the vehicle") is controlled by the color (i.e., traffic light color) of a traffic light located ahead of the vehicle. For instance, if the traffic light color of the traffic light ahead of the vehicle is red during the travel under ACC, braking may be applied to bring the vehicle to a stopping state.

However, for instance, at a road intersection with clear visibility, multiple of traffic lights will be simultaneously recognized within a detection area of the vehicle. Therefore, when the multiple of traffic lights are recognized, the vehicle exterior environment recognition device must identify one or more traffic lights which emit the traffic light color for the vehicle (they will be control inputs) from the multiple traffic lights, and control the traveling state of the vehicle based on the traffic light color. Here, the course of the vehicle may be grasped based on a lane line on a road surface, and a traffic light existing on the course of the vehicle may be used as the control input of the vehicle. However, if the lane is hard to be recognized according to weather, time, and/or environment outside the vehicle, or if there is no lane line on the road surface at the first place, the traffic light to be used as the control input may not be able to be identified depending on the environment outside the vehicle. Thus, in this example, a vehicle exterior environment recognition device is provided, which can improve the accuracy of identifying the traffic light to be used as the control input for controlling the vehicle, regardless of the environment outside the vehicle.

(Environment Recognition System 100)

FIG. 1 is a block diagram illustrating a connecting relation of an environment recognition system 100. The environment recognition system 100 includes a pair of imaging devices 110, a vehicle exterior environment recognition device 120, and a vehicle control device 130 (which is typically comprised of an engine control unit (ECU)), which are all provided inside a vehicle 1.

Each imaging device 110 includes an image sensor comprised of one or more charge-coupled devices (CCDs) or one or more complementary metal-oxide semiconductors (CMOSs). The imaging device 110 can image the environment ahead of the vehicle 1 to generate a color image consisting of three hues (R (red), G (green), B (blue)), or a monochrome image. Here, the color image imaged by the imaging device 110 is referred to as a luminance image, and thus the color image is distinguished from a distance image described later.

Moreover, in this example, two imaging devices 110 are provided so as to be spaced from each other in substantially horizontal (lateral) directions so that optical axes of the two imaging devices 110 are oriented substantially parallel to each other toward the traveling direction of the vehicle 1. The imaging device 110 sequentially generates the image data which is obtained by imaging object(s) which exist within a detection area ahead of the vehicle 1 per frame, for instance, at every 1/60 seconds (60 fps). Here, the objects to be recognized include solid objects which exist independently, such as another vehicles, a pedestrian, a traffic light, a road (course) and a guardrail, as well as an object which can be identified as parts of the solid object, such as a taillight, a blinker, a light emitting part of the traffic light. Each functional module described below carries out processing for every frame, in response to refreshing of such image data as a trigger.

The vehicle exterior environment recognition device 120 acquires the image data from each of the two imaging devices 110, derives a parallax between them by using so-called pattern matching, and associates the derived parallax information (corresponding to a depth distance described later) with the image data to generate the distance image. The luminance image and the distance image will be described later in detail. Further, the vehicle exterior environment recognition device 120 identifies a specific object which corresponds to the object within the detection area ahead of the vehicle 1 by using the luminance based on the luminance image and the depth distance from the vehicle 1 based on the distance image.

When the vehicle exterior environment recognition device 120 identifies the specific object, it derives a relative speed or the like of the specific object (e.g., leading vehicle) while tracking the specific object, and then determines whether the possibility of the vehicle 1 colliding with the specific object is high. Here, if the possibility of the collision is determined to be high, the vehicle exterior environment recognition device 120 gives (informs) a vehicle operator a warning indication through a display unit 122 installed in front of the operator, and outputs information indicative of the warning to the vehicle control device 130.

The vehicle control device 130 receives operative inputs of the operator through a steering wheel 132, an accelerator pedal (gas pedal) 134 and a brake pedal 136, and controls the vehicle 1 by transmitting the inputs to a steering mechanism 142, a drive mechanism 144, and a brake mechanism 146, respectively. Further, the vehicle control device 130 controls the drive mechanism 144 and the brake mechanism 146 according to instructions from the vehicle exterior environment recognition device 120.

Hereinafter, a configuration of the vehicle exterior environment recognition device 120 will be described in detail. Here, an identifying procedure of the traffic light to be used as a control input, and the traveling path which is a path on which the vehicle 1 is going to travel, which are features of this example, will be described in detail, and description of configurations unrelated to the features of this example is omitted.

(Vehicle Exterior Environment Recognition Device 120)

Figure 2:
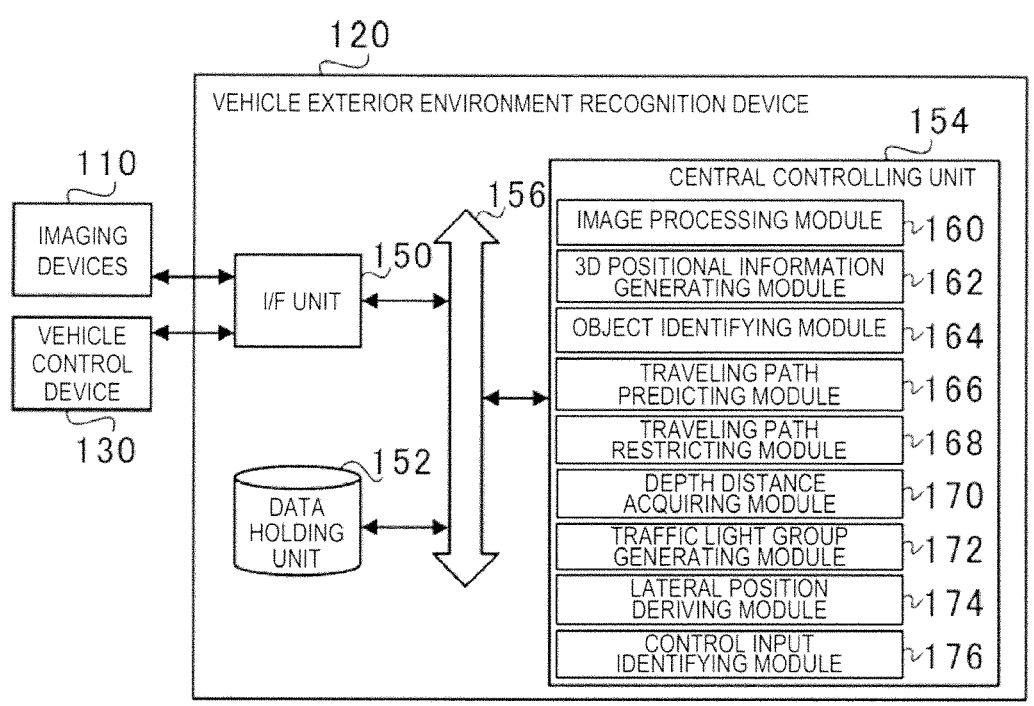
FIG. 2 is a functional block diagram schematically illustrating functions of a vehicle exterior environment recognition device.

FIG. 2 is a functional block diagram schematically illustrating functions of the vehicle exterior environment recognition device 120. As illustrated in FIG. 2, the vehicle exterior environment recognition device 120 includes an interface (I/F) unit 150, a data holding unit 152, and a central controlling unit 154.

The I/F unit 150 is an interface for bidirectional information exchange with the imaging devices 110 and the vehicle control device 130. The data holding unit 152 is comprised of one or more RAMs, one or more flash memories, one or more HDDs, etc., and holds various information required for processing of each functional unit illustrated below. In addition, the data holding unit 152 temporarily holds the image data received from the imaging devices 110.

The central controlling unit 154 is comprised of one or more integrated circuits including, one or more central processing units (CPUs), one or more ROMs where one or more programs or the like are stored, and one or more RAMs as work areas or the like. The central controlling unit 154 controls, for instance, the I/F unit 150 and the data holding unit 152, through a system bus 156. In this example, the central controlling unit 154 also functions as an image processing module 160, a three-dimensional (3D) positional information generating module 162, an object identifying module 164, a traveling path predicting module 166, a traveling path restricting module 168, a depth distance acquiring module 170, a traffic light group generating module 172, a lateral position deriving module 174, and a control input identifying module 176. Hereinafter, detailed operations will be described in order of image processing, object identification processing, traveling path identification processing, and control input identification processing, based on general purposes of such functional modules.

(Image Processing)

The image processing module 160 acquires the image data from each of the two imaging devices 110, and derives the parallax by using so-called pattern matching, as described above. The pattern matching optionally extracts a block (e.g., a matrix of 4 pixels in horizontal directions×4 pixels in vertical directions) from the image data generated by one of the imaging devices 110, and then searches a block in the image data generated by the other imaging device 110, which corresponds to the extracted block. Here, the term "horizontal" as used herein refers to screen lateral directions of the luminance image, and the term "vertical" as used herein refers to screen vertical directions of the luminance image, perpendicular to the horizontal directions.

The pattern matching may compare, between the two pieces of image data, luminance (Y color-difference signal) block by block, where the block refers to an any image position. For instance, the pattern matching method includes SAD (Sum of Absolute Difference) which calculates a difference in luminance, SSD (Sum of Squared intensity Difference) which uses a value after squaring the difference, and NCC (Normalized Cross Correlation) which calculates similarity of variances which are obtained by subtracting an average value of the luminance of the pixels from the luminance of each pixel. The image processing module 160 performs the parallax derivation processing block by block for all the blocks displayed in the detection area (e.g., 600 pixels in horizontal directions×180 pixels in vertical directions). Here, although the block is comprised of 4 pixels in horizontal directions×4 pixels in vertical directions, the number of pixels contained in each block can be set optionally.

Note that, the image processing module 160 can derive the parallax for every block which is a unit of detection resolution; however, it cannot recognize what part of what object the block corresponds to. Therefore, the parallax information is independently derived not per object but per detection resolution (e.g., per block) in the detection area. Here, the image of the image data that is associated with the parallax information derived thereby (corresponding to the depth distance described later) is referred to as the distance image.

Figure 3A:
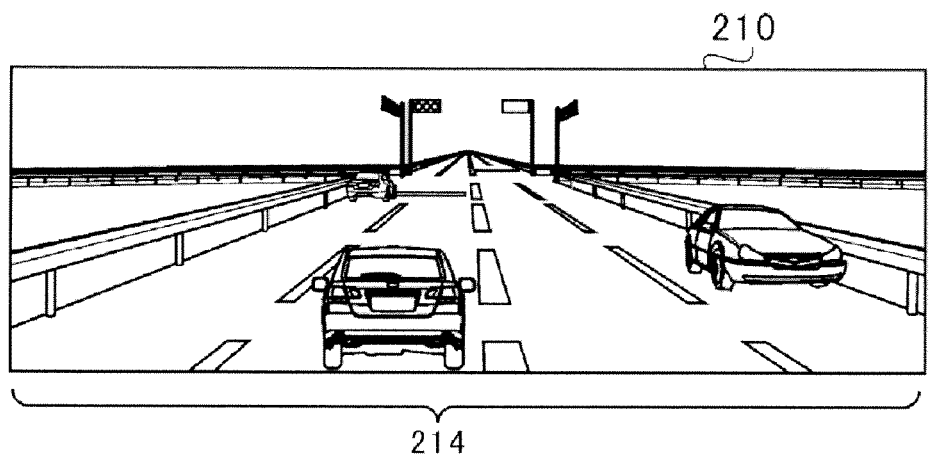
FIGS. 3A and 3B are views illustrating a luminance image and a distance image, respectively.
Figure 3B:
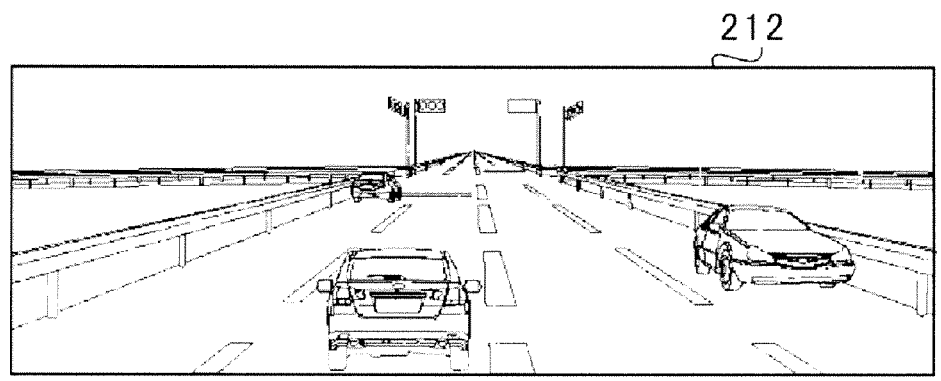

FIGS. 3A and 3B are views illustrating a luminance image 210 and a distance image 212, respectively. For instance, it is assumed that the luminance image 210 (image data) as illustrated in FIG. 3A is generated for a detection area 214 through the two imaging devices 110. For easier understanding, only one of the two luminance images 210 is schematically illustrated. In this example, the image processing module 160 calculates the parallax for every block from such a luminance image 210, and forms the distance image 212 as illustrated in FIG. 3B. Each block in the distance image 212 is associated with the parallax of the block. For convenience of explanation, the blocks for which the parallaxes are derived are represented by black dots.

Returning to FIG. 2, the 3D positional information generating module 162 converts the parallax information for every block in the detection area 214 into three-dimensional (3D) positional information containing a horizontal (lateral) distance, a height, and a depth distance by using so-called a stereo method based on the distance image 212 generated in the image processing module 160. Here, the stereo method is a method of deriving a depth distance of the object with respect to the imaging devices 110 based on the parallax of the object by using a triangulation method. At this time, the 3D positional information generating module 162 derives a height of a subject part from the road surface based on the depth distance of the subject part, and a detected distance on the distance image 212 between the subject part and a point on the road surface at the same depth distance as the subject part. Various known technique can be applied to the derivation processing of this depth distance and the identification processing of the 3D position and thus, description thereof is omitted herein.

(Object Identification Processing)

The object identifying module 164 identifies an object to which the subject part (pixels or blocks) in the detection area 214 corresponds, by using the luminance based on the luminance image 210 and the 3D positional information based on the distance image 212. The object identifying module 164 also functions as various identifying modules according to the object to be identified. In this example, the object identifying module 164 functions as a traffic light identifying module that identifies one or more traffic lights located ahead of the vehicle 1, and the traffic light color (red, yellow, or green) which each traffic light emits.

Figure 4:
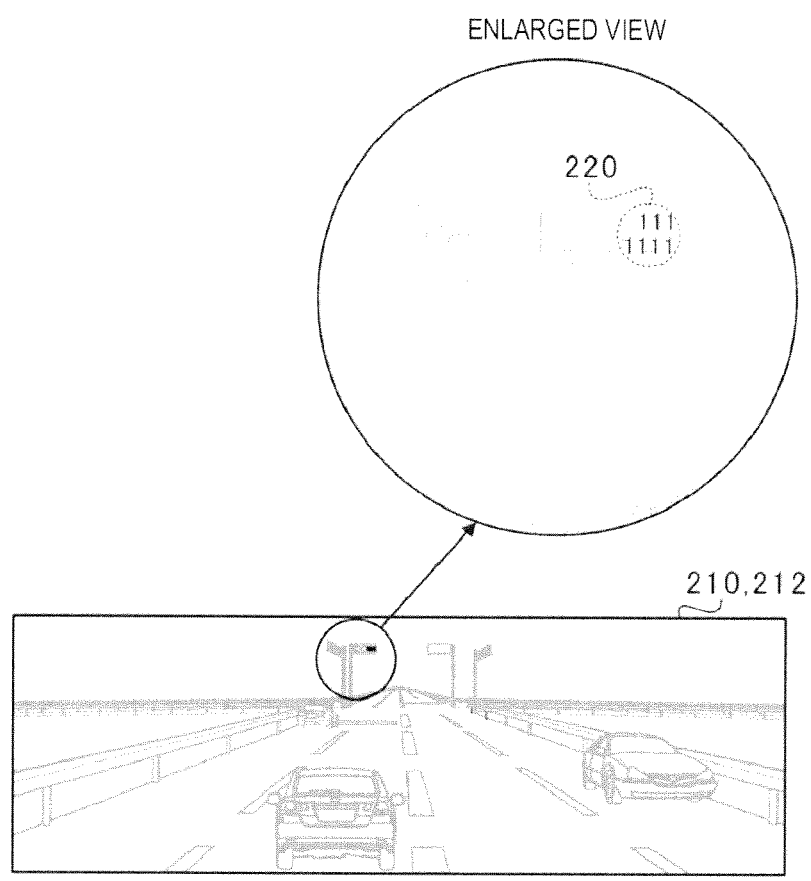
FIG. 4 is a view illustrating an operation of a traffic light identifying module.

FIG. 4 is a view illustrating an operation of the traffic light identifying module. Here, the identifying procedure of the identification processing of a red traffic light color of the traffic light by the traffic light identifying module is described as an instance. First, the traffic light identifying module determines whether the luminance of the any subject part in the luminance image 210 falls within a luminance range (e.g., when the luminance (R) is used as a reference value, luminance (G) is 0.5 or less times of the reference value (R), and luminance (B) is 0.38 or less times of the reference value (R)) of the object (red traffic light color). Then, if the luminance values fall within the target luminance ranges, an identification number indicative of the object is assigned to the subject part. Here, as illustrated in an enlarged view of FIG. 4, the identification number "1" is assigned to the subject part corresponding to the object (red traffic light color).

Next, the traffic light identifying module calculates, using the any subject part as a reference point, a difference in horizontal distance and a difference in height between the subject part concerned and other subject parts, respectively (a difference in depth distance may also be calculated). Then, the traffic light identifying module groups the subject part, and other subject parts of which the differences are within a predetermined range, because the other subject parts can be considered to correspond to the same object (i.e., the same identification numbers are assigned). Thus, these subject parts are considered to be one unitary subject part group. Here, the predetermined range is represented by distances in a real space, and any value (e.g., 1.0 m) can be used as the distances. Similarly, for the subject parts newly added by such grouping, the traffic light identifying module groups, using the newly-added subject part as a reference point, subject parts of which the horizontal distance differences and the height differences are within the predetermined range and which are considered to be the same object (red traffic light color). As a result, if the distances of the subject parts assigned with the same identification number are within the predetermined range, all the subject parts will be grouped in the same group. Here, as illustrated in the enlarged view of FIG. 4, the subject parts assigned with the identification number "1" are grouped into a subject part group 220.

Next, the traffic light identifying module determines whether the subject part group 220 satisfies predetermined conditions, such as a height range (e.g., 4.5 to 7.0 m), a width range (e.g., 0.05 to 0.2 m), the shape (e.g., circular) which are associated with the object. Here, for the shape, the shape is compared with a template which is associated with the object in advance (pattern matching), and the condition is determined to be satisfied when the correlation is a predetermined value or greater. Then, if the predetermined conditions are satisfied, the subject part group 220 is concluded to be the object (red traffic light color). Although the instance of identifying the red traffic light color as the object is given above, it is needless to say that the traffic light identifying module can also identify the yellow light color and the green traffic light color (or may be other color).

Further, if the subject part group 220 has features specific to the object, the determination of the object may be performed using the features as the determination conditions. For instance, if the light-emitting elements of the traffic light are comprised of LEDs (Light Emitting Diodes), the light-emitting elements blink on and off at a cycle (e.g., 100 Hz) which cannot be recognized by human eyes. Therefore, the traffic light identifying module may determine the object (red traffic light color) based on the change over time in the luminance of the subject part of the luminance image 210, which is acquired asynchronously to the blink timing of the LEDs.

(Traveling Path Identification Processing)

As described above, in this example, it is necessary to identify the traffic light to be used as the control input of the vehicle 1 from one or more traffic lights recognized within the detection area 214 ahead of the vehicle 1, and to control the traveling state of the vehicle 1 based on the traffic light color. The traffic light to be used as the control input is identified based on the traveling path of the vehicle 1. Therefore, the traveling path which is a path on which the vehicle 1 is going to travel is first identified based on a current traveling condition of the vehicle 1, such as a traveling speed, an angular speed, or a steering angle of the vehicle 1.

However, the traveling path predicted based on the current traveling condition may not match with an actual traveling path. If the predicted traveling path does not match with the actual traveling path, the traffic light which should originally be used as the control input cannot be identified, and the traffic light may unintentionally be excluded from the control input. One instance of such a case may include a case where the vehicle operator steers to the right at high speed without using a blinker when the vehicle 1 is traveling straight ahead. In this case, the steering operation is not intended to be a right turn, but it is very likely performed to avoid an obstacle or to change the lane. Therefore, the traffic light which should be used as the control input should not be changed easily before and after the steering operation, and the traffic light should be identified, while the traveling condition is treated as a state where the vehicle is traveling straight ahead. However, since the traveling condition is associated with the right turn, the traveling path predicted based on the current traveling condition will be a curve in the right turn direction. Thus, the traffic light which should originally be used as the control input may be excluded from the control input. Therefore, a restriction in a width direction is provided for the traveling path in this example.

The traveling path predicting module 166 predicts the traveling path which is a path on which the vehicle 1 is going to travel based on the angular speed (yaw rate) and the traveling speed of the vehicle 1. If a steering angle (steering) of the vehicle 1 can be obtained, the traveling path can also be predicted based on the steering angle and the traveling speed. Regarding the derivation of the traveling path, various existing arts, such as JP-A No. 2012-185562, JP-A No. 2010-100120, JP-A No. 2008-130059, and JP-A No. 2007-186175, can be applied, and thus explanation thereof will be omitted herein.

The traveling path restricting module 168 restricts the predicted traveling path in the width direction according to at least one or more parameters selected from the group consisting of the traveling speed, the operating condition of the blinker, the steering angle, and the angular speed of the vehicle 1. Thus, the traveling path is identified.

Figure 5:
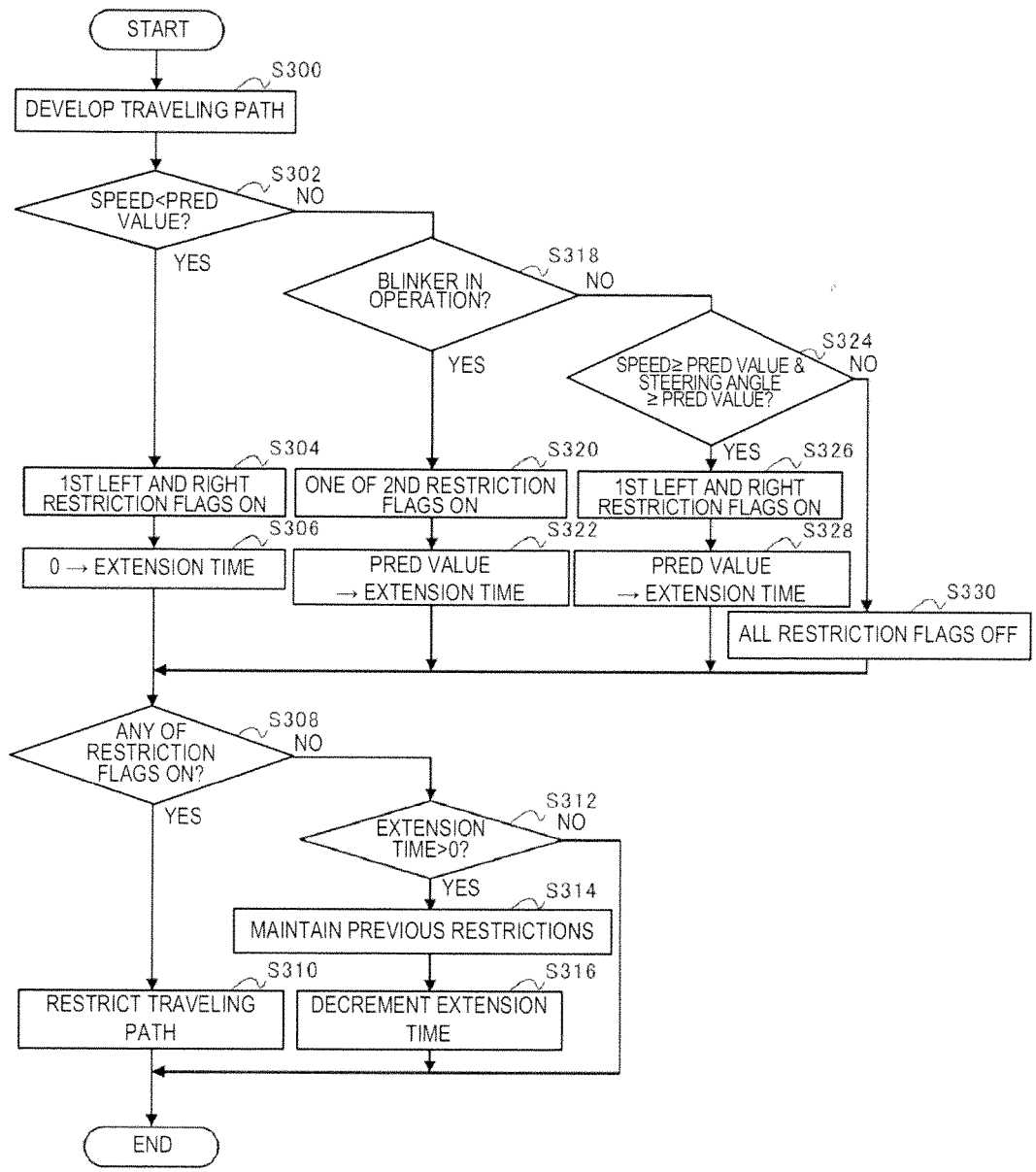
FIG. 5 is a flowchart illustrating an operation of a traveling path restricting module.

FIG. 5 is a flowchart illustrating an operation of the traveling path restricting module 168, and FIGS. 6A and 6B, and FIGS. 7 and 8 are diagrams illustrating the restricted traveling path. Referring to FIG. 5, the traveling path restricting module 168 first develops the traveling path predicted by the traveling path predicting module 166 on a road surface (S300).

Then, the traveling path restricting module 168 determines whether the traveling speed of the vehicle 1 is a predetermined value (e.g., 30 km/h) or less (S302). As a result, if the traveling speed of the vehicle 1 is determined to be the predetermined value or less (YES at S302), the traveling path restricting module 168 changes a first left restriction flag and a first right restriction flag to ON (S304), and sets 0 as an extension time (S306). Here, the first left restriction flag and a second left restriction flag described later are flags indicative of restrictions on the left side on the road surface with respect to ahead of the vehicle 1, and distances to which the traveling path is restricted are different from each other. The first right restriction flag and a second right restriction flag are flags indicative of restrictions on the right side on the road surface ahead of the vehicle 1, and distances to which the traveling path is restricted are different from each other. The extension time is a time length during which the restriction at the time is maintained after the conditions are no longer satisfied.

Figure 6A:
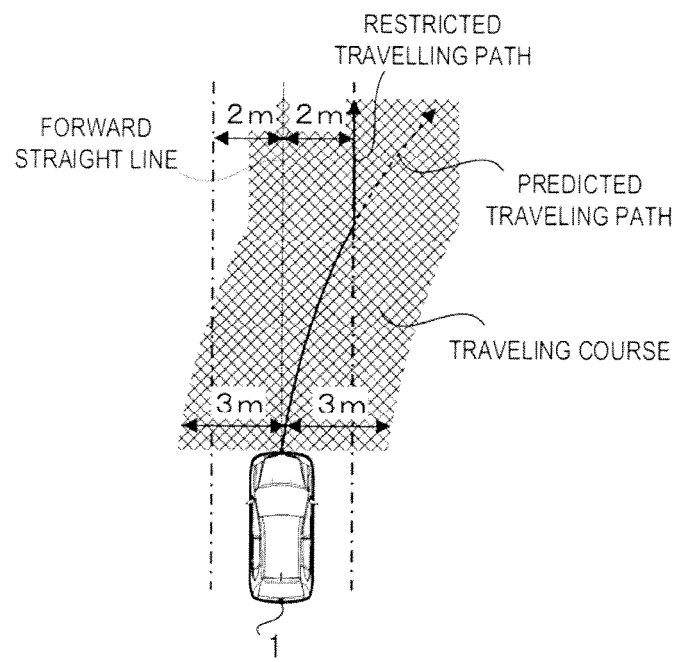
FIGS. 6A and 6B are views illustrating a restricted traveling path.
Figure 6B:
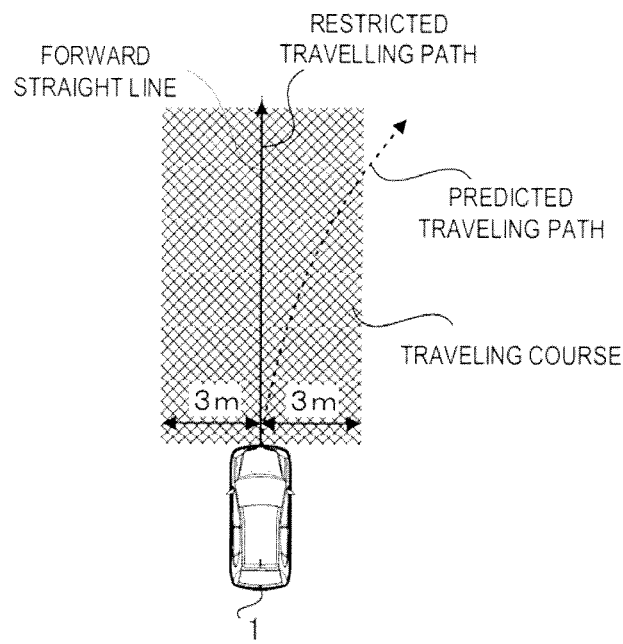

Then, the traveling path restricting module 168 determines whether any of the first left restriction flag, the second left restriction flag, the first right restriction flag, and the second right restriction flag is ON (S308). As a result, if any of the conditions is satisfied (YES at S308), the traveling path restricting module 168 restricts the ON flagged side (either left or right) of the traveling path developed (S310). For instance, if the first left restriction flag or the second left restriction flag is ON, the traveling path restricting module 168 restricts the left side, and if the first right restriction flag or the second right restriction flag is ON, the traveling path restricting module 168 restricts the right side. Specifically, in a case where the traveling path predicting module 166 predicts the traveling path as illustrated in FIG. 6A with a dashed line arrow, if all of the first left restriction flag or the second left restriction flag and the first right restriction flag or the second right restriction flag are ON, the traveling path is restricted by predetermined distances (e.g., 2 m) from a forward straight line of the vehicle 1 (i.e., a straight line extended forward from the center of the vehicle 1 in the width directions), as illustrated with dashed dotted lines on both left and right sides. As a result, a new traveling path is formed as illustrated with a solid arrow. Here, the restricted distances are, for instance, 0 m for the first left restriction flag and the first right restriction flag, and 2 m for the second left restriction flag and the second right restriction flag. Therefore, if the first left restriction flag and the first right restriction flag are ON, the restricted traveling path becomes equal to the forward straight line, as illustrated in FIG. 6B. Alternatively, the restricted distances may be fixed values. As illustrated in FIGS. 6A and 6B with cross-hatching, a course of the vehicle 1, which takes a width necessary for the vehicle 1 travel in consideration, can be expressed by a belt-shaped area having a width of ±3 m on the left and right with respect to the traveling path as a center line.

Returning to FIG. 5, if all of the first left restriction flag, the second left restriction flag, the first right restriction flag, and the second right restriction flag are OFF (NO at S308), the traveling path restricting module 168 determines whether the extension time remains, or whether the extension time is greater than 0 (S312). As a result, if the extension time is greater than 0 (YES at S312), the traveling path restricting module 168 maintains the previous restrictions as illustrated in FIGS. 6A and 6B (S314), and decrements the extension time (S316). On the other hand, if the extension time is 0 (NO at S312), any restriction will not be performed (and, if there is any restrictions, the restrictions will be cancelled). Here, although the previous restrictions are maintained until the extension time is lapsed, the restrictions may be loosened (e.g., gradually widening the restricted width) with the progress of the extension time, and the restrictions may be canceled or eliminated eventually.

Figure 7:
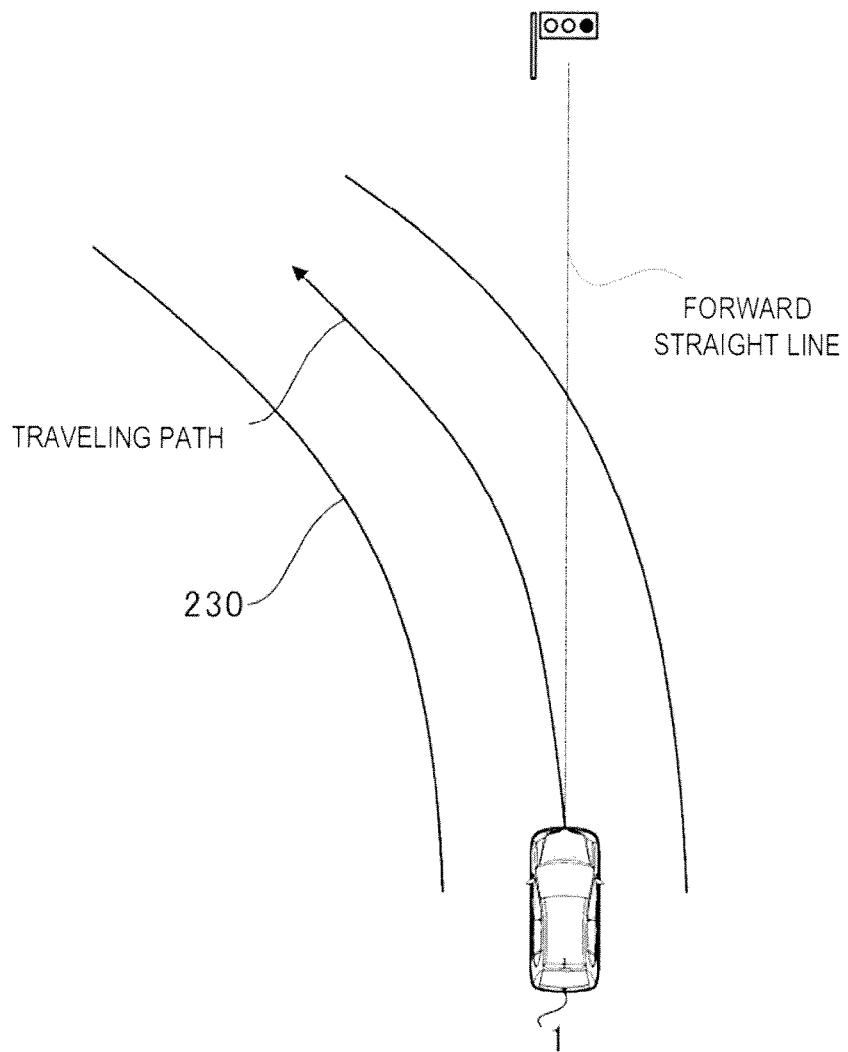
FIG. 7 is a view illustrating the restricted traveling path.

FIG. 7 is a view illustrating the reason for restricting the traveling path if the traveling speed of the vehicle 1 is the predetermined value or less. Restricting the traveling path if the traveling speed of the vehicle 1 is the predetermined value or less is based on the following reasons. For instance, a traffic light which is not the traffic light to be used as the control input may be recognized beyond a curved road 230 having a large curvature as illustrated in FIG. 7 on a highway or a bypass road. When the vehicle 1 is traveling at high speed (e.g., 30 km/h or greater), an erroneous recognition can be avoided by determining a lateral position of the traffic light with respect to the traveling path (traveling path lateral position), as described below. However, if the traveling speed of the vehicle 1 is the predetermined value or less, an actual moving amount of the vehicle 1 is small even if the steering angle and/or the angular speed are large. Thus, since the control will unintentionally be unstable if the traveling path is frequently changed according to the steering angle, the vehicle should be considered to be traveling straight ahead and a traffic light near the vehicle 1 should be used as the control input. Thus, if the traveling speed of the vehicle 1 is the predetermined value or less, the traveling path is restricted to ±0 m, and the vehicle 1 is forced to travel straight ahead. Further, if the traveling speed of the vehicle 1 is the predetermined value or less, the extension time is set to 0, and the restriction will be immediately canceled when the conditions are no longer satisfied.

Figure 8:
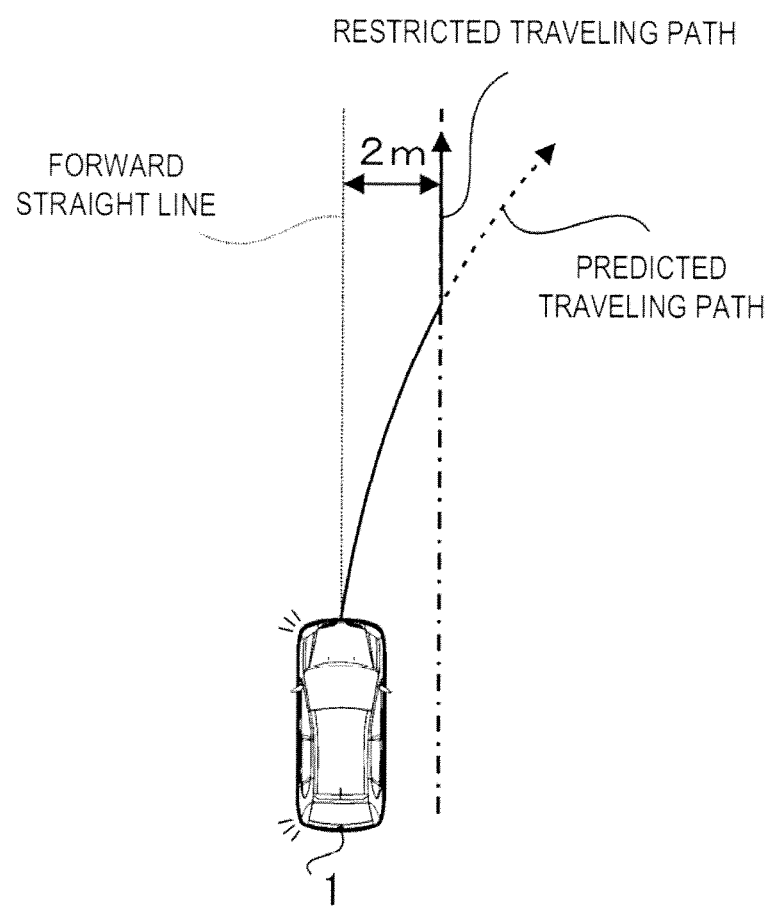
FIG. 8 is a view illustrating the restricted traveling path.

Returning to FIG. 5, at the speed determination step (S302), the traveling speed of the vehicle 1 is determined to be the predetermined value or greater (NO at S302), the traveling path restricting module 168 determines whether the blinker is in operation (S318). As a result, if the blinker is in operation (YES at S318), the traveling path restricting module 168 changes the second right restriction flag or the second left restriction flag with which the blinker is not in operation (S320), and sets a predetermined value (e.g., 4 seconds) to the extension time (S322). The processing is then transited to the above-described flag determination step S308. By setting in this way, for instance, also when the traveling path predicting module 166 predicts the traveling path as illustrated in FIG. 8 with a dashed line arrow, the traveling path is restricted down to a predetermined distance (e.g., 2 m) from the forward straight line of the vehicle 1 only at the right side as illustrated with a dashed dotted line when the blinker is indicating a left turn, and thus a traveling path is newly formed as illustrated with a solid line arrow.

Here, the reason why the traveling path is restricted when the blinker is in operation is, for instance, that it is hard to consider the vehicle operator turning the steering wheel leftward when the blinker is indicating a right turn, and even if the operator turns the steering wheel leftward, since it is only a temporary operation and the vehicle 1 will not move greatly, an erroneous recognition of turning to the opposite direction can be avoided.

Further, when the blinker is in operation, the traveling path restricting module 168 maintains the same restrictions at the time of the blinker being in operation even after the operation of the blinker has been finished, waits for the predetermined extension time been lapsed, and then cancels the restrictions of the traveling path. By doing this, the effects of the control input determination in response to the steering operation after the left or right turn, or the lane change can be reduced.

Returning to FIG. 5, at the blinker determination step (S318), if the blinker is determined not to be in operation (NO at S318), the traveling path restricting module 168 then determines whether an absolute value of the steering angle is a predetermined value or greater (e.g., 30 degrees or greater) (S324). Here, at the speed determination step (S302), the traveling speed of the vehicle 1 has been determined to be the predetermined value or greater (NO at S302). That is, it is determined that the traveling speed of the vehicle 1 is the predetermined value or greater, and the absolute value of the steering angle is the predetermined value or greater.

As a result, if the absolute value of the steering angle is the predetermined value or greater (YES at S324), the traveling path restricting module 168 changes the first right restriction flag and the first left restriction flag to ON (S326), and sets a predetermined value (e.g., 4 seconds) to the extension time (S328). The processing is then transited to the above-described flag determination step S308. By setting in this way, for instance, the traveling path is restricted to ±0 m, and the traveling path is forced to be straight ahead.

Here, the reason why the traveling path is restricted when the traveling speed of the vehicle 1 is the predetermined value or greater and the absolute value of the steering angle is the predetermined value or greater, is that the situation where the steering angle is large while the traveling speed is high can be very likely considered to be avoiding a leading vehicle or changing the lane rather than having an intention of turning. Therefore, the traffic light near the vehicle 1 should be used as the control input.

Further, when the traveling speed of the vehicle 1 becomes the predetermined value or greater and the absolute value of the steering angle becomes the predetermined value or greater the traveling path restricting module 168 maintains the same restrictions at the time of the traveling speed of the vehicle 1 being the predetermined value or greater and the absolute value of the steering angle being the predetermined value or greater, even after the traveling speed of the vehicle 1 becomes the predetermined value or less and the absolute value of the steering angle becomes the predetermined value or less, waits for the predetermined extension time being lapsed, and then cancels the restrictions of the traveling path. By doing this, the effects of the control input determination in response to the steering operation after the left or right turn, or the lane change can be reduced.

At the steering angle determination step (S324), if the absolute value of the steering angle is the predetermined value or less (NO at S324), the traveling path restricting module 168 changes the first left restriction flag, the second left restriction flag, the first right restriction flag, and the second right restriction flag to OFF (the restriction flags which have already been OFF remain the OFF state) (S330), and the processing is then transited to the above-described flag determination step S308. The traveling path can appropriately be restricted through the above processing.

(Control Input Identification Processing)

As the traveling path is thus identified, the traffic light to be used as the control input can be identified based on the traveling path. The traffic light to be used as the control input is identified from one or more traffic lights.

Returning to FIG. 2, the depth distance acquiring module 170 acquires a depth distance which is a distance ahead of the vehicle 1 from the vehicle 1 to the traffic light identified by the traffic light identifying module based on the distance image 212.

The signal group generating module 172 groups one or more traffic lights located within a range where the acquired depth distance is defined in advance to generate a traffic light group. In this example, multiple traffic light groups may be formed so as to be spaced from each other in the depth direction.

Figure 9:
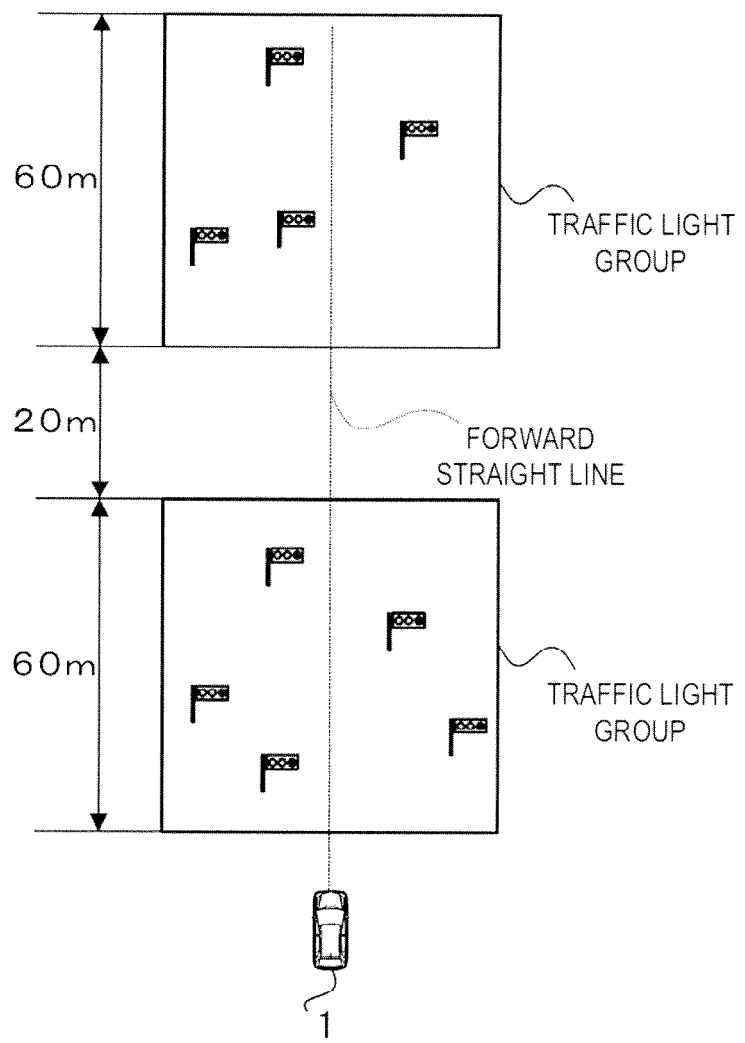
FIG. 9 is a view illustrating a spatial relationship of traffic light groups.

FIG. 9 is a view illustrating a spatial relationship of the traffic light groups. Multiple traffic light groups are formed ahead of the vehicle 1. For instance, in the instance of FIG. 9, one traffic light group is formed near the vehicle 1, and the length in the depth direction is about 60 m. Further, another traffic light group is formed so as to be spaced from the first traffic light group by 20 m.

The lateral position deriving module 174 derives the traveling path lateral position and a forward straight line lateral position of one or more traffic lights contained in each traffic light group. The term "traveling path lateral position" as used herein refers to a relative position of the traffic light in a direction perpendicular to the traveling path, and the term "forward straight line lateral position" as used herein refers to a relative position of the traffic light in the width direction with respect to the forward straight line of the vehicle 1. The traveling path lateral position and the forward straight line lateral position differ in the reference lines, which are the traveling path and the forward straight line, respectively.

The control input identifying module 176 identifies the traffic light to be used as the control input from the multiple traffic lights based on the number of traffic lights, whether the traffic lights are located on both the left and right sides with respect to the restricted traveling path, and whether the traffic light colors of the multiple traffic lights are the same. In this example, the control input identifying module 176 identifies the traffic light to be used as the control input according to the number of traffic lights in one traffic light group and the traveling path lateral position based on the traveling path.

Figure 10:
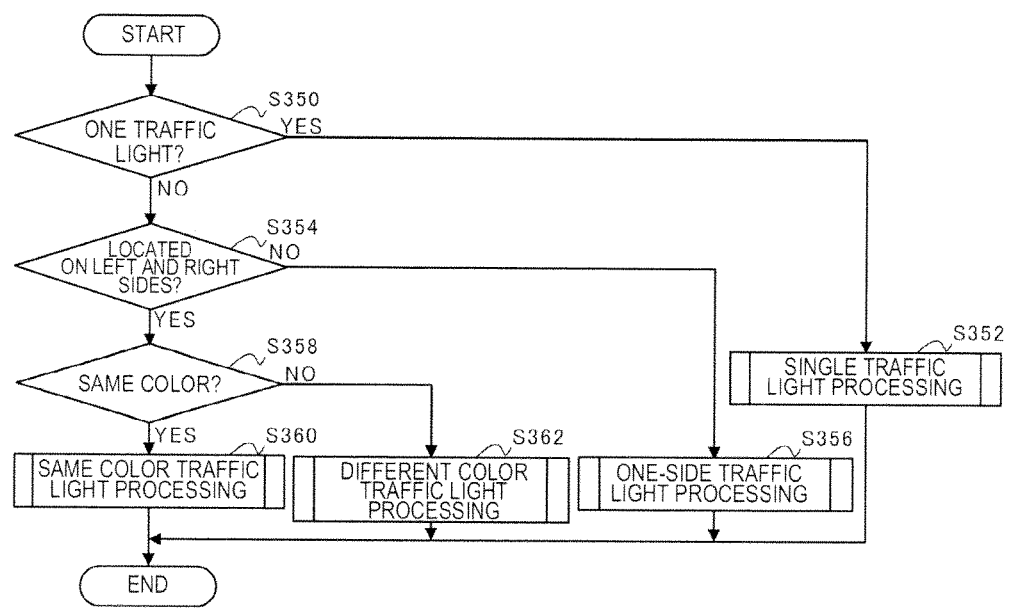
FIG. 10 is a flowchart illustrating an operation of a control input identifying module.

FIG. 10 is a flowchart illustrating an operation of the control input identifying module 176. Referring to FIG. 10, the control input identifying module 176 determines whether only one traffic light exists in a traffic light group (S350). As a result, if there is only one traffic light (YES at S350), the processing is transited to single traffic light processing (S352).

On the other hand, if multiple traffic light exist (NO at S350), the control input identifying module 176 determines whether the multiple traffic lights are located on both left and right sides of the traveling path (S354). As a result, if the traffic lights are not located on both left and right sides of the traveling path, i.e., the traffic light are located only on one side (NO at S354), the processing is transited to one-side traffic light processing (S356). Note that, at the arrangement determination step (S354), the traveling path is temporarily offset in order to improve the accuracy of recognition.

Figure 11:
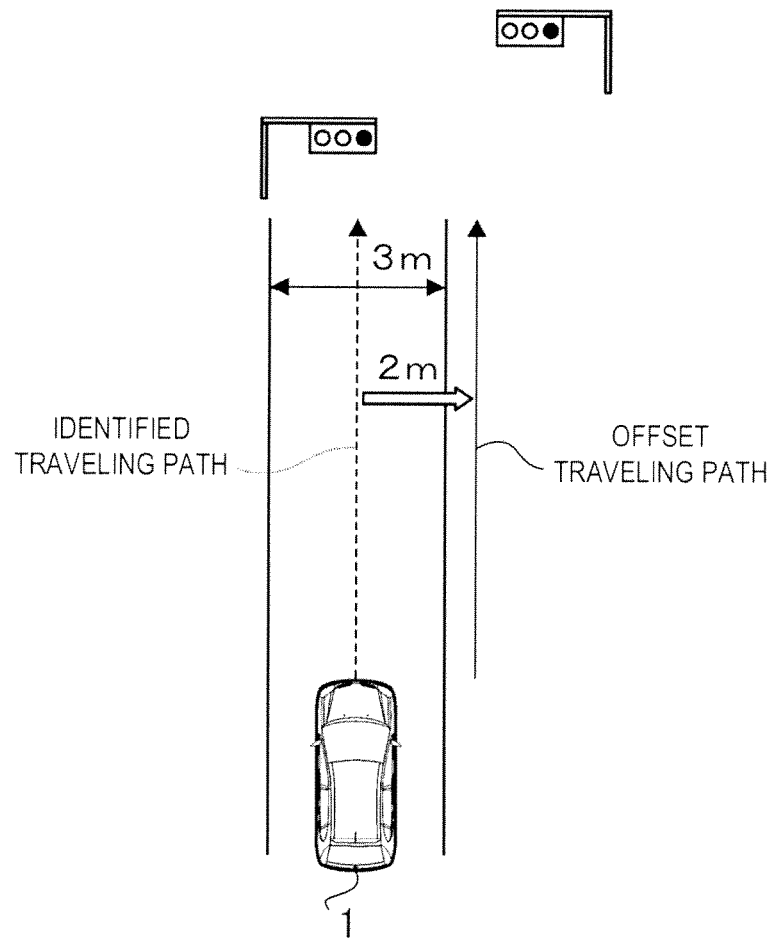
FIG. 11 is a view illustrating an offset of the traveling path.

FIG. 11 is a view illustrating the offset of the traveling path. At the arrangement determination step (S354), the control input identifying module 176 offsets the traveling path identified by the traveling path predicting module 166 and the traveling path restricting module 168 illustrated with a dashed line arrow by 2 m rightward of the vehicle 1 to generate a traveling path illustrated with a solid line arrow. The traffic lights are facilitated in various ways, and, for instance, they may be extended from a side road on the left side of the vehicle 1 and the lighting parts may exist on the course of the vehicle 1. In such a case, the traffic lights may appear irregularly on left or right side of the traveling path depending on the actual traveling position of the vehicle 1. Then, the traffic light which should be determined to be located on the left side of the traveling path may be erroneously recognized to be located on the right side, and, for instance, the one-side traffic light processing S356 may then be carried out. Therefore, in order to determine the traffic light which exists on the course of the vehicle 1 with a high possibility of being used as the control input, as a traffic light located on the left side, the traveling path itself is temporarily offset rightward by 2 m. Here, although the offset width is 2 m, the offset width may be any value as long as it is greater than 1.5 m which is a half of a possible distance between lane lines (i.e., 3 m). Note that, since the positions of the traffic lights differ in some countries, such an offset may be unnecessary, for instance, outside Japan.

Returning to FIG. 10, if the traffic lights are located on both left and right sides of the traveling path (YES at S354), the control input identifying module 176 determines whether the traffic light colors of all the traffic lights of the traffic light group are the same (S358). As a result, if the traffic light colors are the same (YES at S358), the processing is transited to the same color traffic light processing (S360), and, on the other hand, if traffic light colors are not the same (NO at S358), the processing is transited to the different color traffic light processing (S362). Hereinafter, the single traffic light processing (S352), the one-side traffic light processing (S356), the same color traffic light processing (S360), and the different color traffic light processing (S362) are described in detail, respectively.

(Single Traffic Light Processing: S352)

Figure 12:
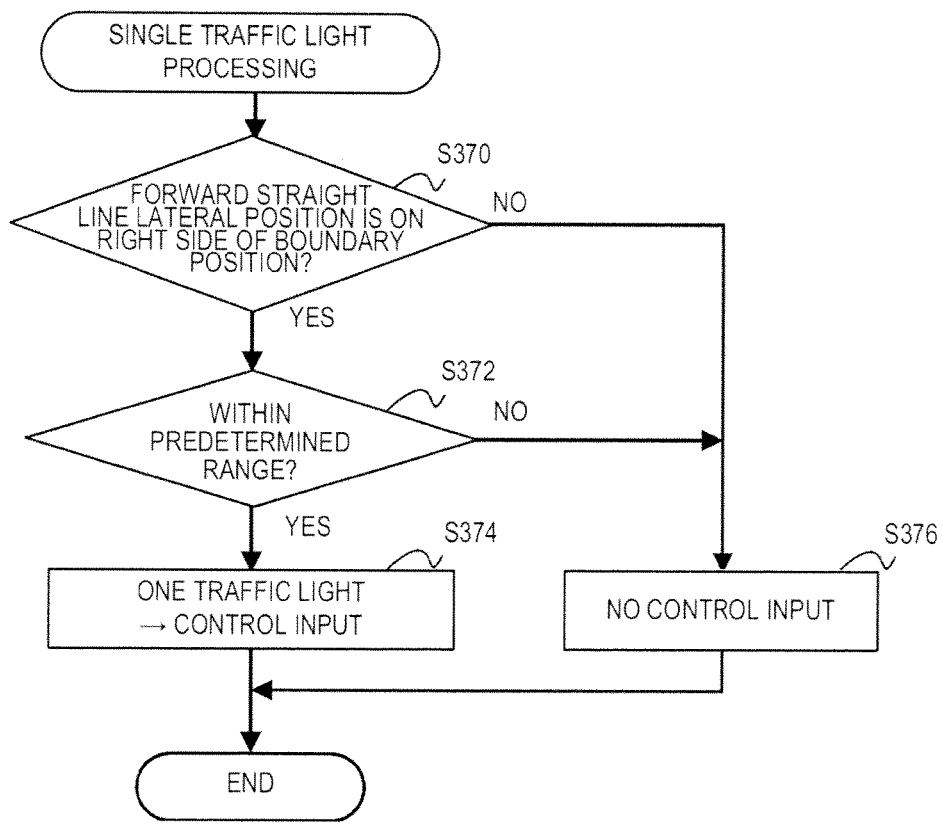
FIG. 12 is a flowchart illustrating a flow of single traffic light processing.
Figure 13:
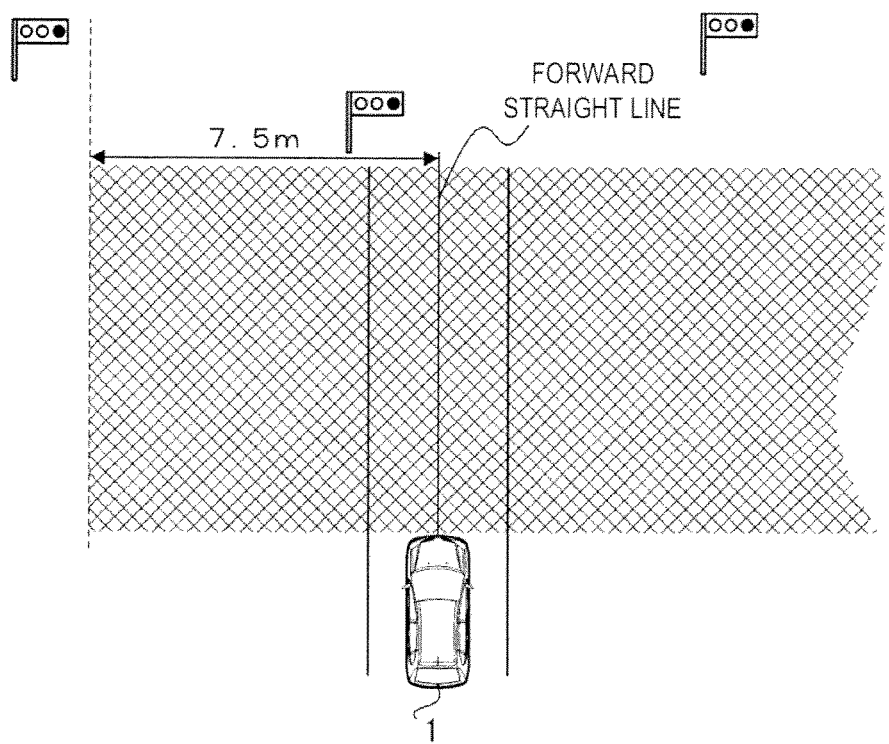
FIG. 13 is a view illustrating the single traffic light processing.

FIG. 12 is a flowchart illustrating a flow of the single traffic light processing, and FIG. 13 is a view illustrating the single traffic light processing.

If only one traffic light exists in one traffic light group, the control input identifying module 176 determines whether the forward straight line lateral position of the traffic light concerned is on the right side of a predetermined boundary position (e.g., −7.5 m) (S370). Here, the signs of the boundary position indicate directions of the forward straight line lateral position, where plus (+) sign indicates the rightward and minus (−) indicates the leftward. As a result, if the traffic light is located on the right side of the predetermined boundary position as illustrated in FIG. 13 with cross-hatching (YES at S370), the control input identifying module 176 determines whether the traveling path lateral position of the traffic light falls within a predetermined range (a third predetermined range: e.g., −7 m to +7 m) and the forward straight line lateral position falls within a predetermined range (a fourth predetermined range: e.g., −10 m to +10 m) (S372). As a result, if both the traveling path lateral position and the forward straight line lateral position satisfy the conditions (YES at S372), the control input identifying module 176 uses the traffic light as the control input (S374).

At the above-described signal position determination step (S372), the traffic light which satisfies the conditions of both the traveling path lateral position and the forward straight line lateral position is a traffic light which exists near the vehicle 1. Thus, the traffic light which can be used as the control input can be extracted appropriately.

On the other hand, if the forward straight line lateral position of the traffic light is on the left side of the predetermined boundary position (NO at S370), or if either one of the traveling path lateral position or the forward straight line lateral position does not satisfy the respective conditions (NO at S372), the control input identifying module 176 does not use the traffic light as the control input (S376).

(One-Side Traffic Light Processing: S356)

Figure 14:
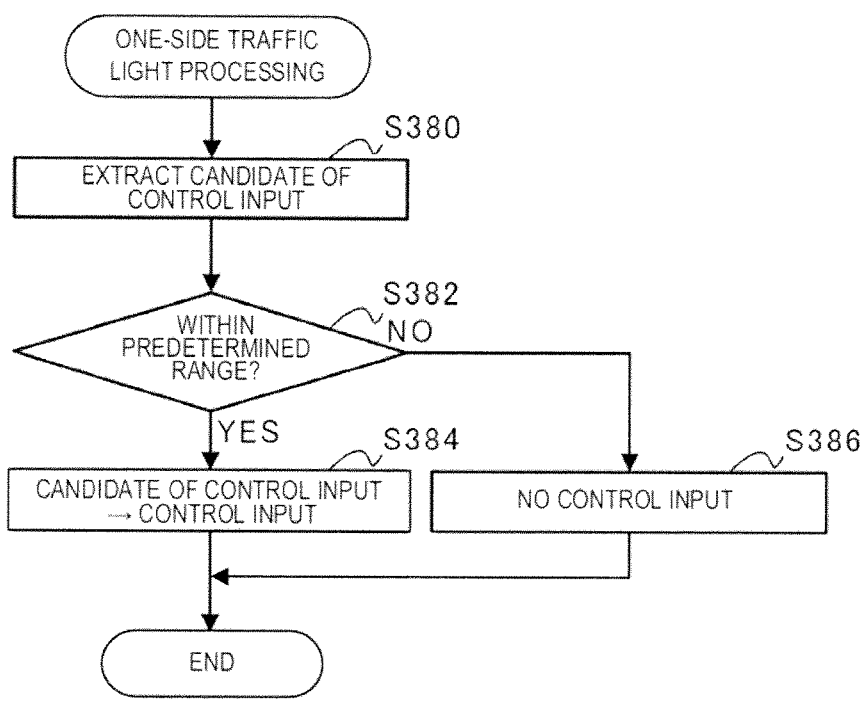
FIG. 14 is a flowchart illustrating a flow of one-side traffic light processing.

FIG. 14 is a flowchart illustrating a flow of the one-side traffic light processing, and FIG. 15 is a view illustrating the one-side traffic light processing.

Figure 15A:
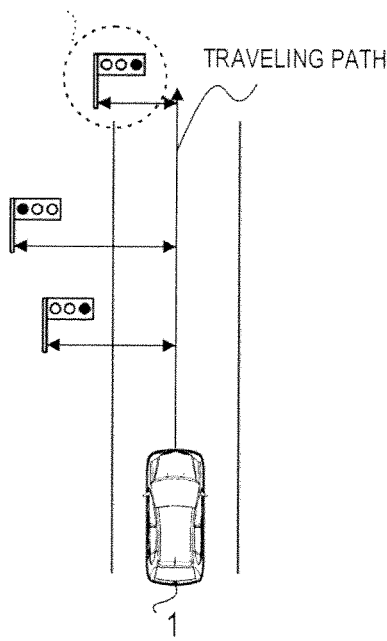
FIGS. 15A to 15C are views illustrating the one-side traffic light processing.

If the traffic light group contains multiple traffic lights and the traveling path lateral positions of the multiple traffic lights are not located on both the left and right sides of the traveling path, i.e., as illustrated in FIG. 15A, if the multiple traffic lights exist only either on the right side or the left side with respect to the traveling path (here, only on the left side in FIG. 15A), the control input identifying module 176 extracts a traffic light of which the traveling path lateral position is nearest to the traveling path as a candidate of the control input (S380). Then, the control input identifying module 176 determines whether the traveling path lateral position of the traffic light nearest to the traveling path falls within the predetermined range (the first predetermined range: e.g., 2 m to +2 m), and the traveling path lateral position of the traffic light furthest from the traveling path falls within the predetermined range (the second predetermined range: e.g., −5 m to +5 m) (S382). As a result, if both the nearest traffic light and the furthest traffic light satisfy the respective conditions (YES at S382), the control input identifying module 176 uses the traffic light nearest to the traveling path and traffic light(s) having the same traffic light color as the control input, while all other traffic lights having different traffic light colors will not be used as the control input (S384).

On the other hand, if either one of the nearest traffic light or the furthest traffic light does not satisfy the respective conditions, or if both the nearest traffic light and the furthest traffic light do not satisfy the respective conditions (NO at S382), no traffic lights in the traffic light group are used as the control input (S386).

Figure 15B:
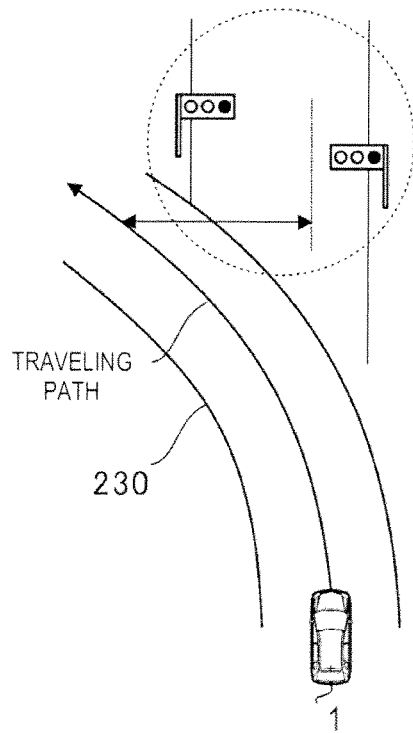
Figure 15C:
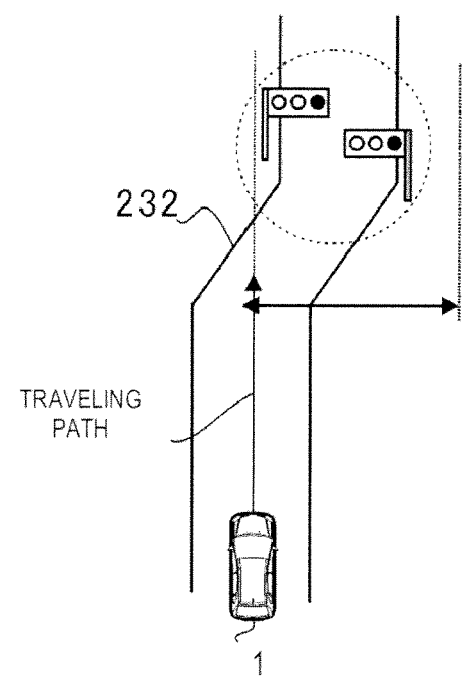

According to the one-side traffic light processing S356, the traveling path lateral position of the traffic light furthest from the traveling path is also determined in addition to the traffic light nearest to the traveling path, unlike the single traffic light processing S352. This is based on the following reasons. For instance, in a highway or a bypass road, beyond a curved road 230 having a large curvature as illustrated in FIG. 15B, the traffic lights which should not be used as the control inputs may be recognized, which are surrounded by a dotted line circle in FIG. 15B. Other roads located near such a highway, a bypass road or the like may be arterial roads or the like in many cases having large road widths. Meanwhile, the traffic lights surrounded by a dotted line circle in FIG. 15C which are located ahead of a road offset at a predetermined location 232 as illustrated in FIG. 15C should be used as the control inputs. The road with such an offset may be a side road or the like in many cases having a small road width. Thus, in this example, focusing on the difference in such a road width, if the road width is large, i.e., a distance between the traffic lights is large, the traffic light group is not used as the control inputs, and, on the other hand, if the road width is small, i.e., the distance between the traffic lights is small, the traffic light group is used as the control inputs. Because such a determination is performed, only the traffic light group of which the traveling path lateral position of the traffic light furthest from the traveling path falls within the predetermined range is determined to be the control inputs.

Unlike the single traffic light processing S352, the determination of whether the forward straight line lateral position falls within the predetermined range (the fourth predetermined range: e.g., −10 m to +10 m) is not performed, at the one-side traffic light processing S356, but the determination of the forward straight line lateral position concerned may be added as one of the conditions like the single traffic light processing S352. By doing this, the accuracy of identifying the traffic lights to be used as the control inputs can be further improved.

Thus, if the traffic lights exist only on either one of left or right side of the traveling path, when the traffic lights are located close enough to satisfy the predetermined conditions, the traffic lights can be used as the control inputs, and, on the other hand, when the traffic lights are not located close enough, they can be regarded as the traffic lights of a different course from the traveling course of the vehicle 1, and can be excluded from the control inputs.

(Same Color Traffic Light Processing: S360)

Figure 16:
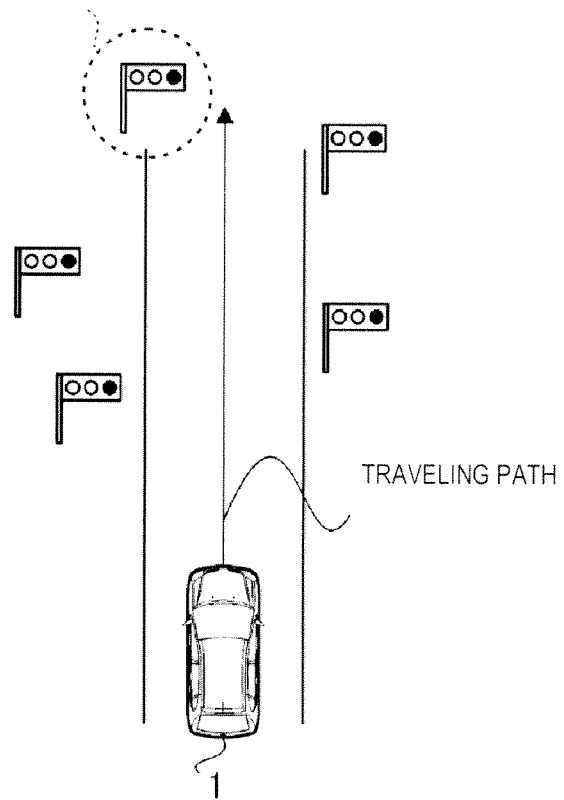
FIG. 16 is a view illustrating a traffic light group in the same color traffic light processing.

FIG. 16 is a diagram illustrating a traffic light group in the same color traffic light processing. When the traveling path lateral positions of the multiple traffic lights are located on both the left and right sides of the traveling path, and if the traffic light colors of all the traffic lights of the traffic light group are the same, the control input identifying module 176 unconditionally uses all the traffic lights of the traffic light group as the control inputs.

(Different Color Traffic Light Processing: S362)

Figure 17:
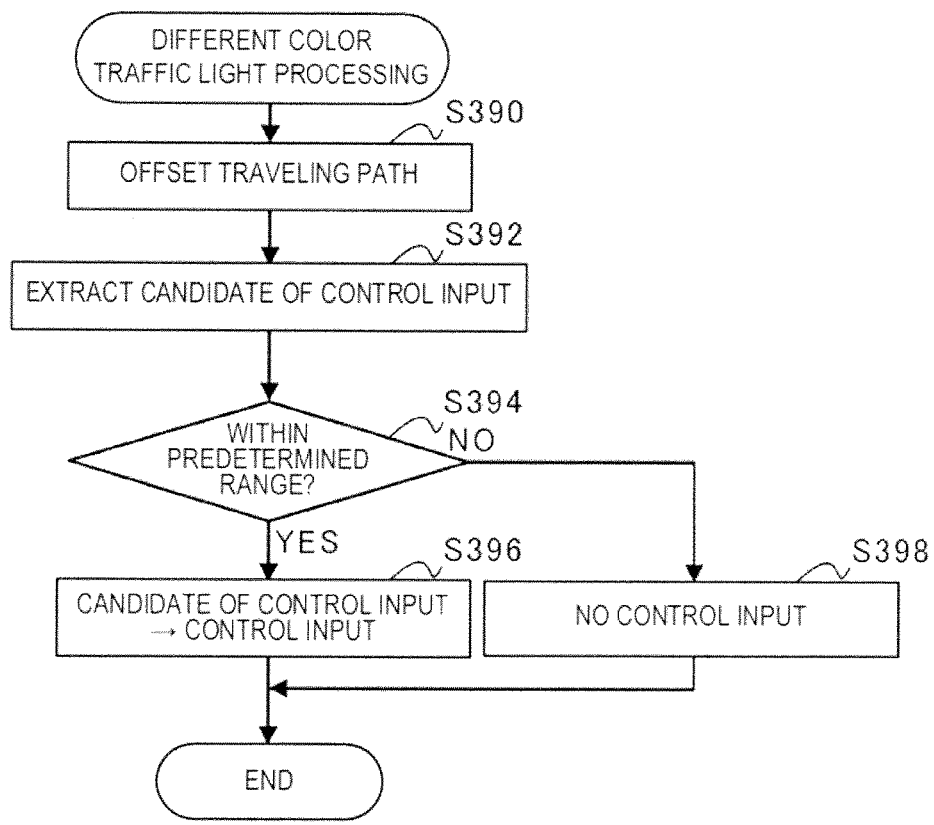
FIG. 17 is a flowchart illustrating a flow of different color traffic light processing.
Figure 18A:
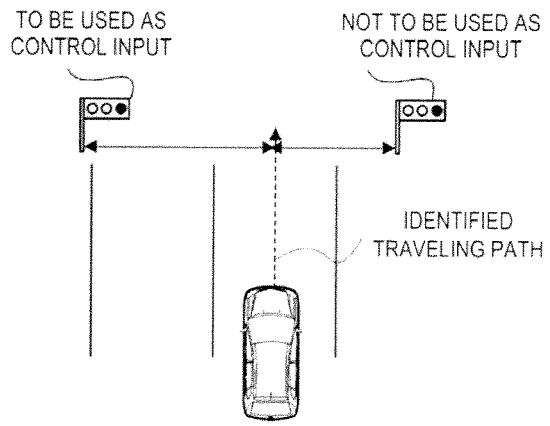
FIGS. 18A to 18C are views illustrating the different color traffic light processing.
Figure 18B:
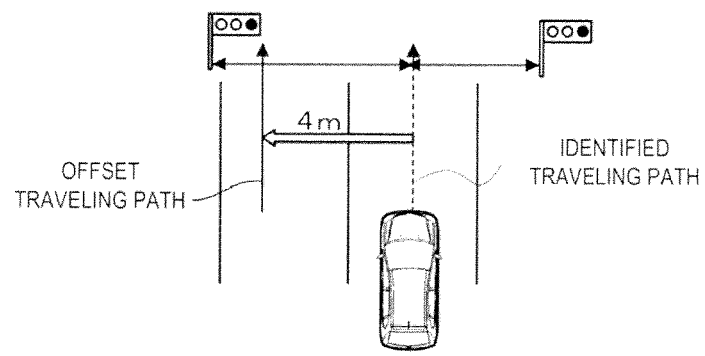
Figure 18C:
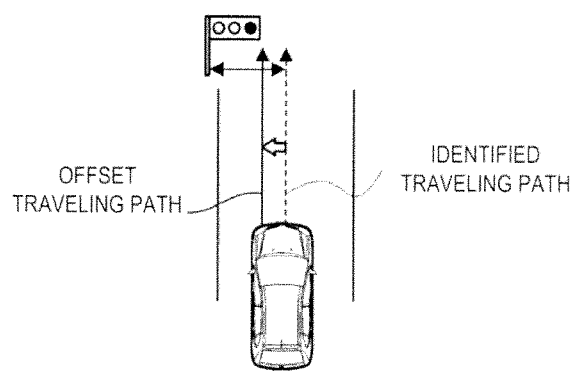
Figure 19:
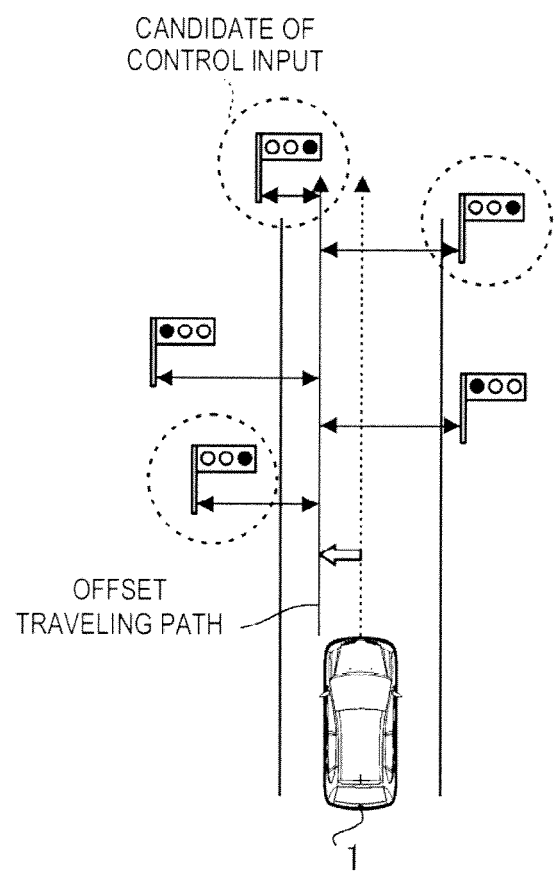
FIG. 19 is a view illustrating the different color traffic light processing.

FIG. 17 is a flowchart illustrating a flow of the different color traffic light processing, and FIGS. 18 and 19 are diagrams illustrating the different color traffic light processing.

When the traveling path lateral positions of the multiple traffic lights are located on both the left and right sides of the traveling path, and if the traffic light colors of the traffic lights of the traffic light group are not the same (i.e., if at least two or more traffic light colors exist), the control input identifying module 176 offsets the traveling path in order to improve the accuracy of recognition (S390).

If the vehicle 1 is traveling on a route, on a right side lane of a road having a multiple lanes as illustrated in FIG. 18A, the distance of the traffic light, which should be used as the control input, from the traveling path may become longer than that of the traffic light which should not be used as the control input. Thus, there is a possibility that the traffic light which should not be used as the control input may be extracted as a candidate of the control input. For this reason, as illustrated in FIG. 18B, the control input identifying module 176 offsets the traveling path illustrated with a dashed line arrow by 4 m leftward of the vehicle 1 to generate a traveling path illustrated with a solid line arrow. By doing this, the traffic light located on the left side of the vehicle 1 can be preferentially used as the candidate of the control input. Although the offset width is 4 m herein, any other offset width can be selected as long as it is greater than the possible distance between the lanes (i.e., 3 m).

However, as illustrated in FIG. 18C, if only one lane exists on a road on the course of the vehicle 1, there is a possibility that the traffic light to be used as the control input may be located further than the traveling path when the traveling path is offset by 4 m. For this reason, the offset is limited up to the traveling path reaching a traffic light for the first time, i.e., a nearest traffic light on the left side of the traveling path before the offset.

Returning to FIG. 17, the control input identifying module 176 extracts one traffic light of which the traveling path lateral position is nearest to the traveling path, as a candidate of the control input (S392). Then, the control input identifying module 176 determines whether the traveling path lateral position of the traffic light nearest to the traveling path falls within the predetermined range (e.g., −7 m to +7 m) (S394). As a result, if the traveling path lateral position falls within the predetermined range (YES at S394), the control input identifying module 176 uses the traffic light nearest to the traveling path, as well as traffic light(s) having the same traffic light color, are used as the control inputs, and will not use all other traffic lights having different traffic light colors as the control inputs, as illustrated in FIG. 19 (S396).

On the other hand, if the traveling path lateral position of the traffic light nearest to the traveling path does not fall within the predetermined range (NO at S394), no traffic lights in the traffic light group are used as the control inputs (S398).

As described above, if the traffic light is located close enough to satisfy the predetermined conditions, when traffic light colors of traffic lights of the traffic light group are not the same, the traffic light can be used as the control input, and, on the other hand, if the traffic light is not located close enough, the traffic light can be excluded from the control inputs because the traffic light can be concluded to be a traffic light on a different course from the traveling course of the vehicle 1.

In this example, a traffic light group is extracted one by one from traffic light groups closer to the vehicle 1 (i.e., toward the vehicle 1) among (one or more) traffic light groups generated by the traffic light group generating module 172, and any of the single traffic light processing (S352), the one-side traffic light processing (S356), the same color traffic light processing (S360), or the different color traffic light processing (S362), described above, is carried out for the extracted traffic light group. Then, one or more traffic lights to be used as the control input(s) and one traffic light color are identified for each of the traffic light groups.

Thus, when the traffic light color is identified, the vehicle exterior environment recognition device 120 controls the traveling state of the vehicle 1 according to the traffic light color of the traffic light to be used as the control input. For instance, when a traffic light color of a traffic light in a traffic light group nearest to the vehicle 1 is red, the vehicle 1 is braked based on the color of red, and, on the other hand, when the traffic light color is green, another traffic light color of another traffic light in another traffic light group second closest to the vehicle 1 is referred to execute the control based on the second traffic light color.

As described above, the vehicle exterior environment recognition device 120 of this example can appropriately identify the traffic light to be used as the control input of the vehicle 1 based on the number of traffic lights, whether the traffic lights are located on both the left and right sides of the traveling path, and whether the traffic light colors of the multiple traffic lights are the same, even if the multiple traffic lights are located by various patterns. Therefore, it becomes possible to improve the accuracy of identification. Further, the accuracy of identifying the traffic light can further be improved by restricting the traveling path in the width direction to reduce the error of the traveling path predicted based on the traveling condition with respect to the actual traveling path, and avoid the exclusion of the traffic light which should be used as the control input from the control input.

Further, one or more programs which cause a computer to function as the vehicle exterior environment recognition device 120, or one or more storage media on which the program(s) is recorded, such as flexible discs, magneto-optic discs, ROMs, CDs, DVDs, BDs, which are readable by the computer are provided. Note that the term "program" as used herein refers to one or more data sets which are described with any languages and describing methods.

Although a suitable example according to the present disclosure is described above referring to the accompanying drawings, the present disclosure is not limited to this example. It is apparent that those skilled in the art can comprehend various kinds of changes or modifications within the scope described in the appended claims, and it should be understood that the technical scope of the present disclosure also encompasses those derivatives.

For instance, although the traveling path is predicted and the traveling path to which the restriction in the width direction is further applied is used as a premise of identifying the traffic light to be used as the control input in the example described above, a predicted traveling path may also be used as it is, without applying the restriction to identify the traffic light to be used as the control input.

Further, although suitable values are illustrated as the predetermined value, the predetermined range, the predetermined condition, the predetermined distance, and the predetermined extension time in the example described above, various values may be optionally set other than these values.

Note that it is not necessary to process each process of the traveling path identification processing and the control input identification processing described above in time series of the orders described as the flowcharts, but the processing may also include parallel processing or subroutine(s).

The present disclosure is directed to the vehicle exterior environment recognition device which recognizes the environment outside the vehicle, and, more particularly, the present disclosure can be used for the vehicle exterior environment recognition device which identifies the traffic light to be used as the control input of the vehicle.

The invention claimed is:

1. A vehicle external environment recognition device, comprising:
a traffic light identifying module that identifies one or more traffic lights located ahead of a vehicle and a respective traffic light color of the one or more traffic lights;
a control input identifying module that determines, when multiple traffic lights are identified, whether or not to select one of the identified traffic lights as a control input based on a location of the one of the identified traffic lights with respect to the traveling path of the vehicle, respective locations of one or more other identified traffic lights with respect to the traveling path of the vehicle, and the respective traffic light colors of the identified traffic lights;
a traveling path predicting module that predicts the traveling path based on a current traveling condition of the vehicle; and
a traveling path restricting module that restricts the predicted traveling path in the width direction of the vehicle, according to at least one or more parameters selected from the group consisting of a traveling speed of the vehicle, an indicating state of a blinker, an angular speed of the vehicle, and a steering angle,
wherein the control input identifying module identifies a traffic light that exists ahead of the vehicle based on the restricted traveling path and that is to be used as the control input, and
wherein, when the traveling speed of the vehicle is a predetermined value or greater, and when the angular speed of the vehicle or an absolute value of the steering angle is a predetermined value or greater, the traveling path restricting module restricts the traveling path on both the left and right sides in the width direction.

2. The vehicle external environment recognition device of claim 1, wherein, when the multiple traffic lights are located on both the left and right sides of the traveling path of the vehicle, and when all the multiple traffic lights are same in color, the control input identifying module uses all the multiple traffic lights as the control input.

3. The vehicle external environment recognition device of claim 1, wherein, when the multiple traffic lights are located on both the left and right sides of the traveling path of the vehicle, and when the multiple traffic lights are not same in color, the control input identifying module uses a traffic light of which a traveling path lateral position that is defined as a relative position in a direction perpendicular to the traveling path is nearest to the traveling path, and one or more other traffic lights which have a same color as the traffic light, as the control inputs.

4. The vehicle exterior environment recognition device of claim 1, wherein the traveling path restricting module restricts the traveling path on both the left and right sides in the width direction, when the traveling speed of the vehicle is a predetermined value or less.

5. The vehicle external environment recognition device of claim 1, wherein the traveling path restricting module restricts the traveling path to either one of left and right side for which the blinker is not operated, when the other blinker is in operation.

6. The vehicle external environment recognition device of claim 5, wherein the traveling path restricting module waits for progress of a predetermined extension time after the operation of the blinker is finished, and then cancels the restriction of the traveling path.

7. A vehicle external environment recognition device, comprising:
an integrated circuit including a central processing unit (CPU); and
a memory which stores a program is stored,
wherein the program, when executed by the CPU, causes the integrated circuit to:

identify one or more traffic lights located ahead of a vehicle and a respective traffic light color of the one or more traffic lights;

determine, when multiple traffic lights are identified, whether or not to select one of the identified traffic lights as a control input based on a location of the one of the identified traffic lights with respect to the traveling path of the vehicle, respective locations of one or more other identified traffic lights with respect to the traveling path of the vehicle, and the respective traffic light colors of the identified traffic lights;

predict the traveling path based on a current traveling condition of the vehicle;

restrict the predicted traveling path in the width direction of the vehicle, according to at least one or more parameters selected from the group consisting of a traveling speed of the vehicle, an indicating state of a blinker, an angular speed of the vehicle, and a steering angle;

identify a traffic light that exists ahead of the vehicle based on the restricted traveling path and that is to be used as the control input; and restrict the traveling path on both the left and right sides in the width direction, when the traveling speed of the vehicle is a predetermined value or greater, and when the angular speed of the vehicle or an absolute value of the steering angle is a predetermined value or greater.

8. The vehicle external environment recognition device of claim 7, wherein the program, when executed by the CPU, further causes the integrated circuit to:

utilize all the multiple traffic lights as the control input, when the multiple traffic lights are located on both the left and right sides of the traveling path of the vehicle, and when all the multiple traffic lights are same in color.

9. The vehicle external environment recognition device of claim 7, wherein the program, when executed by the CPU, further causes the integrated circuit to:

utilize a traffic light of which a traveling path lateral position that is defined as a relative position in a direction perpendicular to the traveling path is nearest to the traveling path, and one or more other traffic lights which have a same color as the traffic light, as the control inputs, when the multiple traffic lights are located on both the left and right sides of the traveling path of the vehicle, and when the multiple traffic lights are not same in color.

10. The vehicle exterior environment recognition device of claim 7, wherein the program, when executed by the CPU, further causes the integrated circuit to:

restrict the traveling path on both the left and right sides in the width direction, when the traveling speed of the vehicle is a predetermined value or less.

11. The vehicle external environment recognition device of claim 7, wherein the program, when executed by the CPU, further causes the integrated circuit to:

restrict the traveling path to either one of left and right side for which the blinker is not operated, when the other blinker is in operation.

12. The vehicle external environment recognition device of claim 11, wherein the program, when executed by the CPU, further causes the integrated circuit to:

wait for progress of a predetermined extension time after the operation of the blinker is finished, and then cancels the restriction of the traveling path.

* * * * *